United States Patent

[11] 3,626,379

[72] Inventor William R. Wrigley
181 Claridge St., Satellite Beach, Fla. 32935

[21] Appl. No. 107,325
[22] Filed Jan. 18, 1971
[45] Patented Dec. 7, 1971
Continuation of application Ser. No. 733,736, May 20, 1968. This application Jan. 18, 1971, Ser. No. 107,325

[54] UNIVERSAL DATA ACQUISITION AND CONTROL SYSTEM
5 Claims, 4 Drawing Figs.

[52] U.S. Cl. .......... 340/172.5
[51] Int. Cl. .......... G08b 11/00, G08c 15/00
[50] Field of Search .......... 340/172.5; 235/157

[56] References Cited

UNITED STATES PATENTS 3,314,051 4/1967 Willcox et al. .......... 340/172.5

*Primary Examiner*—Gareth D. Shaw
*Assistant Examiner*—Mark Edward Nusbaum
*Attorney*—Seidel, Gonda & Goldhammer

ABSTRACT: A universal data acquisition and control system using only two lines between a plurality of remote data units. The system uses a central computer connected to a central data unit. The central data unit is tied by two transmission lines (a response line and interrogate line) to a plurality of remote data units. The transmission of information on the interrogate line uses a combination of modulation schemes to maintain costs at a minimum while maximizing the amount in time that information can be transferred from the central data unit to the remote data unit.

INVENTOR
WILLIAM R. WRIGLEY
BY
Seidel & Gonda
ATTORNEYS

INVENTOR
WILLIAM R. WRIGLEY
BY
Seidel & Gonda
ATTORNEYS

UNIVERSAL DATA ACQUISITION AND CONTROL SYSTEM

This is a continuation of application Ser. No. 733,736, filed May 20, 1968.

This invention relates to a universal data acquisition and control system. More particularly, this invention relates to a universal data acquisition and control system that connects a central computer to remote data units using only two transmission lines (interrogate line and a response line).

One of the objects of the present invention is to reduce the high cost of installation in systems involving centralized control of remote data units. One of the primary costs of any such system is the large number of conductors needed to transmit each function or switch closure to the central control computer over a separate wire or pair of wires. Not only is the additional wire expensive, but the installation costs are almost prohibitive in many cases. There are several options which can be adopted to overcome the plural wire installation cost but each of these merely replaces one type of cost with another. For example, the data can be multiplexed onto a reduced number of transmission lines. There are existing systems which use digital signal transmission over communication wire pairs (No. 18, 20, or 22 AWG twisted pair 600 ohm line). By using eight lines, a parallel transfer of words can be accomplished and bit rates on each line can average approximately 300 bits/second for a cumulative rate on the eight lines of approximately 2,400 bits/second. The disadvantage of this type of scheme is the low transmission rates and still relatively large wire and installation costs.

Another optional solution to the problem is to reduce the number of wire pairs to one communication pair with a bandwidth of approximately 3,000 Hz. which is within the standard voice channel of 300 to 3,300 Hz. Some transmission schemes, such as the Bell Modems Models 201A and 210B, Lenkurt, and Milgo data transmitters have bit rates of 2,000 to 4,800 bits per second. However, these transmission schemes are designed primarily for long transmission lines and are too costly for systems using 100 or more remote data units.

Still a third possible solution exists. This is tone transmission systems, such as the Trepac Data-Tone system, which uses single tone or combinations of tones. The primary disadvantage of this type of modulation and detection scheme is its relatively low transmission rate necessitated by the narrow bandwidths.

Yet another possible solution to the problem is to use radiofrequency transmission. Such systems are unreliable because of noise and there are not sufficient frequencies available to make it generally useful.

Considering the problem in more detail, it is apparent that its solution requires the optimization of the following factors: high rate of transmission; high signal to noise ratios; variable bit rates; variable message lengths; nonsynchronous transmission scheme; a transmission format adaptable to computer interface designs; low cost for receiver detection and decoding circuitry; and minimum installation cost. The problem of high signal to noise ratios, wide bandwidth, mechanical security and low installation cost can be overcome by using only two transmission lines of the proper type. In this regard, coaxial cables such as RG-58 and RG-8 provide good signal to noise ratios with acceptable attenuation if frequencies are kept below 1 megacycle.

The remaining problems listed above can be overcome by selecting a proper modulation scheme. Thus, the modulation scheme should permit a flexible message format for nonsynchronous operation with variable message length. In any system of this type, the remote data units will account for a large part of the cost. The cost of the central data unit is relatively unimportant because only one is required. However, there may be as many as 1,000 remote data units which require the installation of various types of modulation apparatus, such as AM, FM and PSK. AM modulation is the least costly but FM and PSK are less sensitive to noise. In addition to its noise sensitivity, AM makes comparatively inefficient use of the available bandwidth. However, the use of coaxial transmission lines keeps the AM noise level at a minimum. Moreover, even though AM is inefficient from the bit per cycle standpoint, it has a large compensating factor in that it is a relatively inexpensive detection method which can be used in the remote data units.

The present invention adopts AM as part of the transmission scheme, together with FM and coaxial cables and operates at carrier frequencies that maximize the bit rates while minimizing the attenuation of the coaxial cable.

The addressing scheme necessarily plays an important part in any universal data acquisition and control system that intends to select one of up to 1,000 remote data units. In a standard pulse code modulation scheme, a serial word would be used to transmit the address. If this standard method is used in the present invention, the remote data unit would then need the following items: a start of message device, a serial to parallel converter, a comparison circuit to decode the address, and subsequent storage for the received message. Thus, pulse code modulation of a binary address meets the criteria of inexpensive detection but requires costly circuitry for decoding the address. In addition, subsequent work performed by the remote data unit and a transmit circuit from the remote data unit back to the central data unit would require an additional group of duplicate circuits. In other words, the least expensive modulation scheme results in an overall rise in cost because of the expenditure to perform address decoding and remote data unit return transmission. The overall result is that binary transmission results in high-cost remote data units.

However, if instead of using a conventional binary serial to parallel converter, an octal scheme is substituted, the requirements for the addressing circuit are reduced to three bit times where a time increment is the smallest logical element the format of an interrogate and response line. It therefore follows that an FM eight-level detection scheme in combination with an AM presence-absence is the best compromise in terms of costs. The detection circuits are higher in cost than straight AM but not as high as PSK or FM analogs. Moreover, the addressing, decoding, and storage cost in each remote data unit is reduced significantly.

A complete remote data unit always has a particular application. The application may be varied but all have certain common aspects. Thus, data or processes tied into the remote data unit must be sampled, stored, and transmitted by the remote data unit back to the control data unit. In another situation where the remote data unit is driving display circuitry, it must be available to transmit the data at the proper time. But these particular aspects of remote data units are common to all such units and hence cannot be considered as avoidable costs.

By selecting an eight-level FM modulation scheme in combination with a presence-absence AM sensing in a particular sequence, the entire interrogate and response of the remote data unit can be encompassed. Thus, a signal sequence is provided so that meaning is given to the signal as a function of the position of the FM signals relative to a master synchronous pulse. This is explained in more detail below. Its advantage is that it allows the remote data unit to operate without a separate clock or timing circuits and serves as a format generator for the response line data.

From the foregoing, it can be seen that the object of the present invention is to provide a new and unobvious universal data acquisition and control system that substantially reduces the expense of such a system by spreading the cost over certain functions of the remote data unit. Thus, the same circuits can be used to perform different functions at different times in the receive and transmit cycle.

The overall scheme for accomplishing the following is to use a master synchronization pulse at the start of every transmission. This alerts all the remote data units to test the following address. The next signal is the address which is an octal FM code. Three digits provide the addresses. The next portion of the signal format is a master synchronization reset which has the function of resetting all of the remote data units not addressed in their previous condition of waiting for the next master synchronization pulse. The addressed remote data unit responds to the master synchronization reset pulse by turning on circuitry which will decode the following data word. Thereafter, a data word is transmitted. In the addressed remote data unit, each succeeding end of word pulse advances the word count and distributes data as required for each successive word. After transmission of the last message, the end of word pulse is not transmitted. Instead, another pulse of different and unique frequency designated end of message pulse is transmitted. This pulse disconnects the addressed remote data unit and returns it to the waiting condition of the remaining remote data units.

The foregoing schemes allows a message to be any multiple of data words in length. In addition, the circuitry permits the message to be terminated at any time by simply transmitting the end of message pulse. The discriminating factor in regard to modulation and detection of the master synchronization pulse, the master synchronization reset pulse, the end of word pulse and the end of message pulse is frequency. The master synchronization and end of message pulses can occur at any time or in any sequence and will be correctly interpreted by each remote data unit. The master synchronization reset pulse will perform its function, i.e., address identification, only when transmitted after the master synchronization pulse and before the end of message pulse.

As indicated above, each data word in this system preferably contains eight binary positions with a separate carrier frequency being used for each bit position. However, more or less binary positions are acceptable and can be used. Several methods of transmission and detection are possible. For example, transmission of the data words could be accomplished without changing the carrier frequency by using local clocks in each remote data unit. These clocks would test each time increment for the presence-absence of a bit. Another more efficient detection method would be to use two frequencies, one indicating a binary "one" and the second indicating a binary "zero." However, this requires a shift register to isolate and identify each bit position. Moreover, variable bit rates cannot be transmitted.

The preferred method in accordance with the present invention is to sequentially change the carrier frequency for each bit position. This has the advantage of eliminating the necessity for local clocks or shift registers in the remote data unit. There is no restraint on transmission word rates by the remote data unit detection or logic circuit. And the same detection circuits used to decode the remote data unit address provide the data word decode. Thus, by simultaneously transmitting over the response line the same detection circuits provide timing and format generation for the return transmission line from the remote data unit to the central data unit.

The foregoing advantages of the present invention are secured by using the system described hereinafter.

For the purpose of illustrating the invention, there is shown in the drawings a form which is presently preferred; it being understood, however, that this invention is not limited to the precise arrangements and instrumentalities shown.

Referring now to the drawing in detail, wherein like numerals indicate like elements, there is shown in FIG. 2 a universal data acquisition and control system designated generally as 10.

Figure 1:
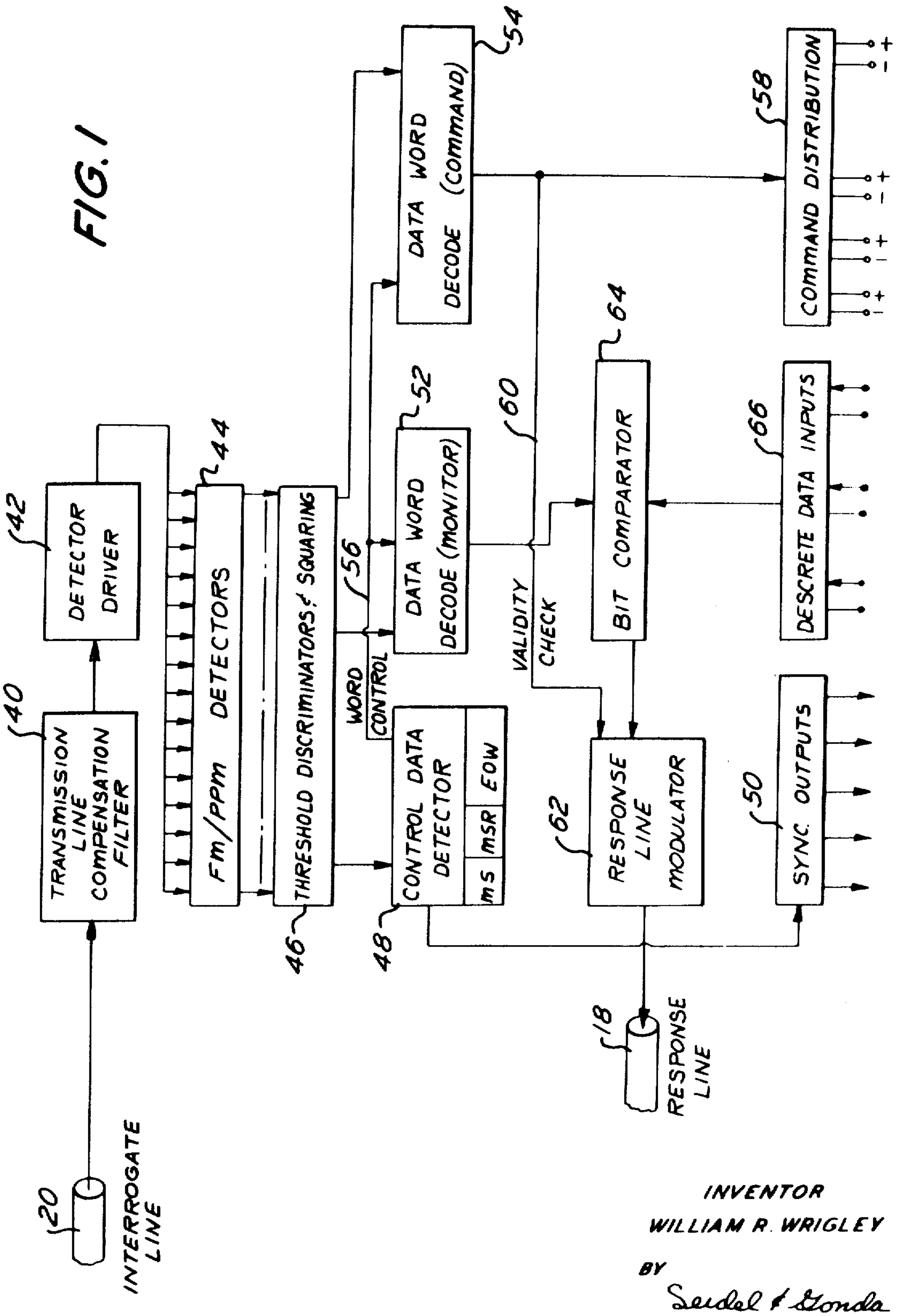
FIG. 1 is a detailed block diagram of a remote data unit useful with the present invention.

As shown, the system includes a central computer 12 which may be any one of several types of computers available on the market. Such computers include the PDP-8; the IBM-1800; the SDS Sigma Series computers; and the Interdata 2, 3 or 4, among others.

The computer 12 is coupled to the computer input-output (I/O) 14 that forms part of the computers listed above. The computer input-output device 14 is of varied but conventional design and need not be described in detail.

The computer input-output device 14 is connected by data lines and control lines to a central data unit 16. The central data unit 16 is connected by coaxial cables 18 and 20 to a plurality of remote data units 22 and 24. Only two remote data units are shown but it should be understood that any number could be connected to the interrogate and response lines 18 and 20. The coaxial cables 18 and 20 have the specifications outlined above. Thus, they should be capable of operating at approximately 1 megacycle with less than one-half db. per 1,000 for attenuation. Coaxial cable RG-58 or coaxial cable RG-8 meets these specifications.

Remote data unit 22 is shown as being connected by a monitor and control line to a process 26. Process 26 is representative of any form of manufacturing process or the like which is to be controlled or sampled by the computer 12. Remote data unit 24 is shown connected to a number of functions which may be typical of such data units. These functions include a digital to analog converter 28, an analog to digital converter 30, a remote teletype writer 32, a cathode-ray tube display unit 34 and a status display 36. These functions are all well known and need not be described in detail.

The central data unit 16 transmits data to the remote data unit over coaxial transmission line 20. The remote data units 22 and 24 transmit to the central control unit over coaxial transmission line 18. These are the only two lines used to connect the central data unit 16 with the remote data units 22 and 24. Thus, separate wires are not provided for the transmission of each switch close or on-off function performed by the remote data unit to the central data unit.

The central data unit consists of an interface logic and means to adjust the voltage and current levels to connect it to the computer 12. In addition, the central data unit 16 is constructed so that information can be transferred from the computer 12 to the central data unit and from the central data unit 16 to the computer. The transfer can be initiated by either the central data unit 16 or the computer 12. In addition to the foregoing, the central data unit 16 accepts specific remote data unit addresses from the computer and establishes contact using the interrogate line 20 with that specific remote data unit. The format for doing this is explained below. A computer 12 may transfer data to the central data unit in parallel groups which the central data unit converts to the serial format. This format is used to generate a signal compatible for transmitting information over the interrogate line 20.

The central data unit 16 continuously accepts data from the computer and transmits it to the remote data unit until the computer instructs the central data unit to cease data transfer. The central data unit 16 then disconnects the remote data unit which was receiving data from the interrogate line 20 and notifies the computer that transmission has been completed. When during the transmission of information from the central data unit 16 to one of the remote data units 22 or 24, data appears on the response line 18, the central data unit will notify the computer. Thereafter, this information is transferred to the computer at the completion of transmission of the current word being transmitted from the central data unit 16 to the remote data unit.

Figures 2, 3, 4:
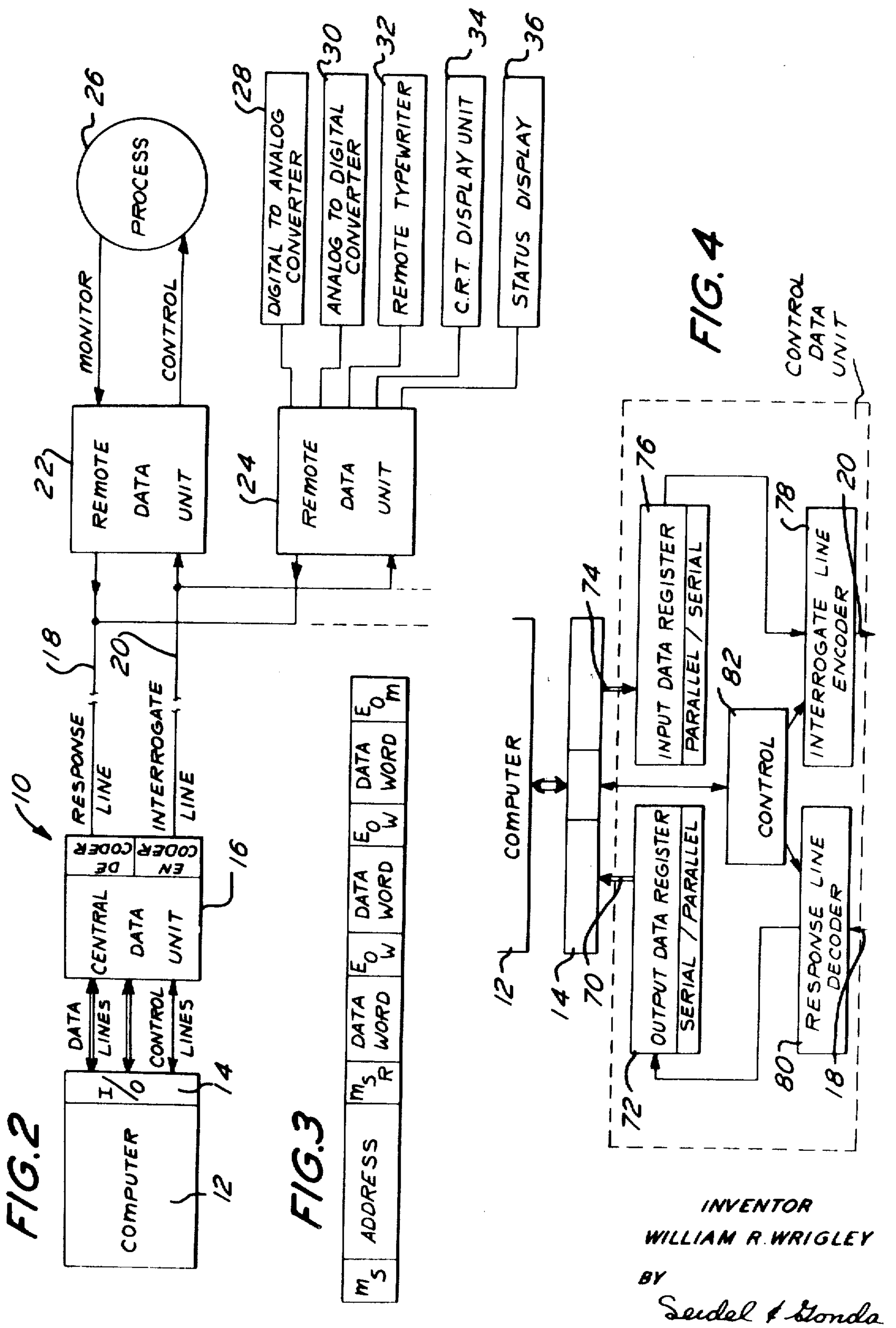
FIG. 2 is a block diagram showing a complete system.
FIG. 3 is an illustration of the format used in accordance with the present invention.
FIG. 4 is a block diagram showing the central data unit.

Referring now to FIG. 4, there is shown a block diagram that is illustrative of a central data unit which may be used in the universal data acquisition and control system of the present invention. As shown, the computer 12 is coupled to its input-output 14 which in turn is parallel coupled by data lines 70 to the output data register 72. Computer input-output 14 is also parallel coupled by data line 74 to the input data register 76. Input data register 76 is of the parallel to serial type and couples data from the computer 12 to the interrogate line encoder 78 which in turn is coupled to the interrogate coaxial transmission line 20. In a like manner, the output data register 72 is of the serial to parallel type and couples data from the response line 18 through a response line decoder 80 into the computer 12. Conventional control circuitry 82 is coupled from the computer 12 to the response line decoder 80 and the interrogate line encoder 78 in a conventional manner. It is unnecessary to describe the particular logic circuitry and control circuitry used in the foregoing mentioned elements since they are conventional.

Referring now to FIG. 3, there is shown a diagrammatic illustration for the format used in the present invention. As explained above, a combination of modulation schemes, including pulse position modulation, frequency modulation and amplitude modulation is used. This is accomplished in the following manner.

The computer 12 will transfer to the central data unit 16 the address of a remote data unit that the computer is to communicate with. This triggers the central data unit which transmits a master synchronization pulse (MS) that is identified by all remote data units as meaning that the address of a particular remote data unit will follow. The master synchronization pulse (MS) is a burst of energy above a certain predetermined amplitude and at a predetermined frequency not otherwise used in the system. Thus, the master synchronization pulse relies on amplitude modulation.

Upon receipt of the master synchronization pulse, all remote data units 22, 24 convert to a special mode that decodes the pulses following the master synchronization pulse. This is done according to a specific frequency versus numeric digit table. Thus, the address is frequency modulated. In accordance with the present invention, the address is comprised of as many octal digits as are required to identify all of the remote data units connected to the central data unit 16. The same frequency modulation detection circuitry is used to decode the data words that follow in the message. A typical frequency versus numeric digit table may have the following values using an octal addressing scheme:

| Numeric Digits | Frequency |
|---|---|
| 0 | $f_3$ |
| 1 | $f_4$ |
| 2 | $f_5$ |
| 3 | $f_6$ |
| 4 | $f_7$ |
| 5 | $f_8$ |
| 6 | $f_9$ |
| 7 | $f_{10}$ |

The sequence of frequencies transmitted by the central data unit on the interrogate line to the remote data units provides the address. This always follows the master synchronization pulse. For example, a sequence of frequencies $f_3$, $f_4$, and $f_5$ would represent an address of 012 to the base 8. Clearly then, the addressing scheme is a frequency modulation-pulse position modulation format.

After the address portion of the format has been transmitted, the central data unit 16 transmits the master synchronization reset pulse (MSR) which disconnects all of the remote data units from further reception of data except the specific remote data unit that has been addressed. In addition, the master synchronization reset pulse initiates a second mode of operation in the addressed remote data unit. The master synchronization reset pulse, like the master synchronization pulse is a burst of energy at a level and frequency not otherwise used in the system. Thus, the master synchronization reset pulse is amplitude modulation.

Following the master synchronization reset pulse, the data word is transmitted over the interrogate line. The data word, like the address, consists of octal system of eight sequential frequencies. However, the master synchronization reset pulse has energized the addressed remote data unit to receive and decode the word in accordance with the sequence of frequencies being transmitted. Thus, the data word, like the address, is a combination of frequency modulation and pulse position modulation. The difference is that the remote data unit has been preset to the required mode of operation by the master synchronization reset pulse. Moreover in the address frequency means a number. In the data word frequency means position since there are eight bits in each data word. Started otherwise, particular frequency will be detected by a particular detector and that detector is connected to a switch function. Therefore, each particular frequency controls a particular switch function and hence explains the meaning of the statement that for the data word frequency means position.

Once the data word is completed, the central data unit sends an end of word pulse unless the entire message is eight bits or less in length. Thus, if another data word is to be transmitted to the addressed remote data unit, an end of word pulse is transmitted to indicate that another data word is to be transmitted. Of course, the data word frequencies have a different meaning than the address frequencies, i.e., each frequency defines the bit position of each data word. The data words use the same frequencies but with different tables of meaning for each subsequent data word. The sequence of data words and end of word pulse continues with a different table meanings attached to each succeeding data word until the message is complete. The addressed remote data unit processes each data word according to the meaning agreed upon in the table of meaning. This corresponds to the location of each bit in each data word.

Once the last data word is transmitted, the computer 12 will indicate end of message to the central data unit 16. The central data unit will then transmit an end of message pulse (EOM) at a predetermined frequency which will disconnect the active remote data unit. Thereafter, the central data unit 16 waits for a new instruction from the computer.

From the foregoing, it should be apparent that this method of transmission allows any length of message to be transmitted to any specific remote data unit.

Referring now to FIG. 1, there is shown a schematic block diagram of a remote data unit capable of functioning in accordance with the foregoing described format. As shown, the coaxial interrogate line 20 is connected to a transmission line compensation filter 40. The transmission line compensation filter 40 is connected to a detector driver 42 which feeds the frequency modulation detectors 44. The frequency modulation functions with respect to the address and data word. They are directly connected to threshold discriminators and squaring circuits 46 which function with the master synchronization pulse, the master synchronization reset pulse, the end of word pulse and end of message pulse. These pulses are distributed from the threshold discriminators 46 to the synchronization output 50 to the data word decode monitor 52 or to the data word decode command 54 as determined by the control data detector 48. Thus, as indicated in the drawing, the output of the control data detector 48 on the line 56 acts as a word control to determine whether the remote data unit should monitor to determine if it is going to receive an address or, if it has already been set by a particular address, to receive a particular command message. The output of the data word decode 54 is fed directly to a command distribution system 58 which applies digital commands to the function being controlled. In addition, the data word decode 54 is connected by the line 60 to the response line modulator 62 to act as a validity check.

The data word decode monitor 52 is connected to a bit comparitor 64 that simultaneously receives bits from the discrete data input 66 so that the remote data unit may respond on the response line. Thus, the bit comparitor 64 is connected to the response line modulator 62. Response line modulator in turn is connected to the response line 18.

Particular circuitry for performing the functions of the elements of the remote data unit is well known and need not be described in detail. Those skilled in the art will understand what circuitry must be used once having had the function of the particular unit described to them.

The format described above fits well with any data word appearing on the response line. Of course, all information transmitted from the remote data units to the central data unit is on the response line 18. Data received over the response line 18 is transferred to the computer from the central data unit at the completion of each eight-bit serial word transmitted by the central data unit 16. This is done prior to accepting the next parallel data word from the computer 12. In addition, the response line 18 provides a closed loop validity check of all commands. This is done by simultaneously transmitting all received commands. The advantages of this type of system check are obvious. For example, by confirming the end of word pulse from each remote data unit, the system can perform an automatic and continuous checkup of the proper operation of the addressed remote data unit.

From the foregoing, it should be obvious that a new and inexpensive universal data acquisition and control system has been described. The system is capable of operating as a peripheral device to a digital computer where there is a requirement for transfer of information into or out of the computer for purposes of process control, process monitoring, driving remote displays, printers, typewriters, digital to analog converters and the like. The system can be applied to perform control functions such as operating remote switches; feeding input data to digital to analog converters; feeding input binary data to remote displays of control devices; operate remote-type converters; and perform process control functions. In addition, the system can monitor remote switches; operate remote analog to digital converters; accept parallel digital data from remote encoders; and manual entry devices; all in alphanumeric or any code which can be expressed in binary form.

By way of example, not limitation, one contemplated mode for effecting the universal data acquisition and control system 10 could include the following circuits and circuit elements.

The transmission line compensation filter 40 and the detector driver could be an amplifier of the type described in Van Nostrand's Scientific Encyclopedia, 4th Edition, 1968, Library of Congress Catalog Card No. 68–20922 (hereinafter referred to as "the reference"), page 84, FIG. 1(*b*) under the definition Amplifier. The frequency response required is shown in FIG. 4, page 85 of the reference where points A and B are chosen to include all of the carrier frequencies and side bands selected for the system. It will be recalled that the system is to cooperate over a coaxial cable such as coaxial RG–58 or coaxial cable RG–8 which in part determines the frequency of the system.

The FM/PPM detectors 44 can be constructed using multiple circuits of the type described and shown in the reference at page 506, FIG. 2. Such circuits can be used since the frequency changes as seen on the interrogate line 20 and respond line 18 are steplike changes.

The threshold discriminators and squaring circuits 46 can consist of conventional Schmitt trigger circuits such as are described in the reference at page 1582.

The control data detector 48, data word decode (monitor) 52 and data word decode (command) 54 can each consist of logic level circuits such as are described in the reference at page 558 under the heading Diode Transistor Logic.

The bit comparator 64 can be multiple NAND circuits such as are described at page 535 of the reference, FIG. (*b*); second column.

The response line modulator 62 can consist of one or more Colpitts oscillators and line drivers such as are described in the reference at page 1255, FIG. 3.

With respect to the control data unit illustrated in FIG. 4, the interrogate line encoder 78 can consist of multiple Colpitts oscillators such as described at page 1255, FIG. 3 of the reference. In a like manner, the response line decoder 80 can consist of detectors such as described for the FM/PPM detectors 44 at page 506, FIG. 2 of the reference.

Finally, the output data register 72, the input data register 76 and the control 80 are straightforward logic circuits including serial to parallel and parallel to serial shift registers (flip-flop type) which temporarily store and transfer binary data to and from the computer in accordance with the requirement of the data format. The logic circuitry is strictly controlled by the format which is set forth in extensive detail in the present specification.

The present invention may be embodied in other specific forms without departing from the spirit or essential attributes thereof and, accordingly, reference should be made to the appended claims, rather than to the foregoing specification as indicating the scope of the invention.

I claim:

1. A system for universal data acquisition and control comprising a computer, a central data unit and a plurality of remote data units, said remote data units being connected to the central data unit by only two transmission lines, one of said transmission lines being an interrogate line and the other being a response line, said central data unit including means to transmit a preset code of predetermined amplitude and frequency, said remote data units having means to condition it for a following code in response to said preset code, said central data unit including means to transmit an address series of pulses of different predetermined frequencies to set one of said remote data units in a decode mode, each of said remote data units having means responsive to a specific predetermined series of codes, said central data unit including means to transmit a reset code to reset said remote data units to their initial condition except the previously set remote data unit, said remote data units having means responsive to said reset code to either reset or adopt an operation mode if previously set, said central data unit having means to transmit a data word, said remote data unit having means to receive said data word, said central data unit and remote data unit having means for transmitting and receiving an end of work code for additional sequential data words, said central data unit having means to transmit and said remote data unit having means to respond to an end of message energy pulse of predetermined amplitude, means in said remote data units for transmitting data on said response line, means in said central data unit for receiving data from said response line and transferring it to the computer at the completion of each data word.

2. A system for universal data acquisition and control comprising a computer, a central data unit and a plurality of remote data units, said remote data unit being connected in said central data units by only two transmission lines, one of said transmission lines being an interrogate line and the other being a response line, said central data unit having means to transmit synchronization amplitude modulated pulses, said remote data unit having means to receive said synchronization amplitude modulated pulses, said synchronization amplitude modulated pulses being a presence-absence sensing system, said central data unit having means to transmit a frequency modulated address signal and a frequency modulated data word, said remote data unit having means to receive said frequency modulated address signal and said frequency modulated data word signal, said amplitude modulated pulses and said frequency modulated pulses being transmitted in a predetermined sequence, said remote data unit having means to respond to said pulses in accordance with the sequence in which said pulses are received.

3. A universal data acquisition system for transmitting information from a central data unit controlled by a computer to a plurality of remote data units, a common interrogate transmission line connected to all of said remote data units, said central data unit having means to transmit a preset code of predetermined amplitude, said remote data units each having means to condition for a following code in response to said preset code, said central data unit including means to transmit an address signal consisting of a series of pulses of different predetermined frequencies to address a particular remote data unit, each of said remote data units having means responsive to a particular address code, said central data unit having means to transmit a reset code to reset all of said remote data units to their initial condition except the addressed remote data unit, each said remote data unit having means responsive to said reset code, said central data unit having means to transmit a data word using a frequency modulation scheme, each remote data unit having means to receive said data word, said central data unit having means for transmitting an end of word code for additional sequential data words, said remote data units having means to receive and respond to said end of word code, said central data unit having means to transmit an amplitude modulated end of message pulse, said remote data unit having means to respond to said end of message pulse.

4. A method of transmitting information from a central data unit controlled by a computer to one of several remote data units connected to said central data unit over a common interrogate transmission line, comprising the steps of transmitting a preset code for predetermined amplitude and frequency to all of said remote data units and detecting said preset code in said remote data units to condition said remote data units for reception of an addressing code, identifying which information is transmitted specifically for reception by a particular remote data unit by means of a combination of frequency modulation and pulse position modulated codes, identifying data words in that particular remote date unit by detecting a combination of frequency modulated and pulse position modulated codes, distinguishing data words from each other by an amplitude modulated end of word code, and distinguishing an end of message by an amplitude modulated end of message pulse, whereby said remote data unit does not require prior knowledge of the transmission bit rate or the number of data words contained in a message.

5. A method of transmitting information from the central data unit controlled by a computer to one of several remote data units in accordance with claim 4 wherein said messages are transmitted in the form of asynchronous data words including the steps of indicating start of transmission of data words by the occurrence of a master synchronization reset pulse or the occurrence of an end of word pulse, and defining the data word by the presence or absence of a frequency specifically assigned to represent a particular bit of several bits which form a data word, such carrier frequencies being transmitted in serial form.

* * * * *